Oct. 13, 1953     F. I. LOUCKES     2,655,375
HOBBYHORSE
Filed Dec. 21, 1951
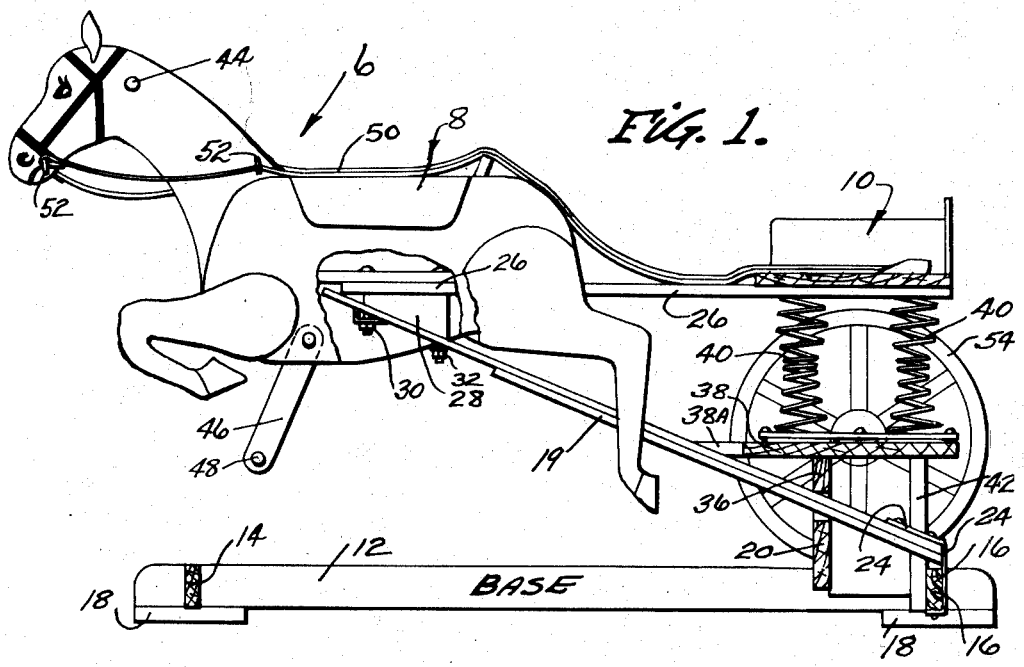
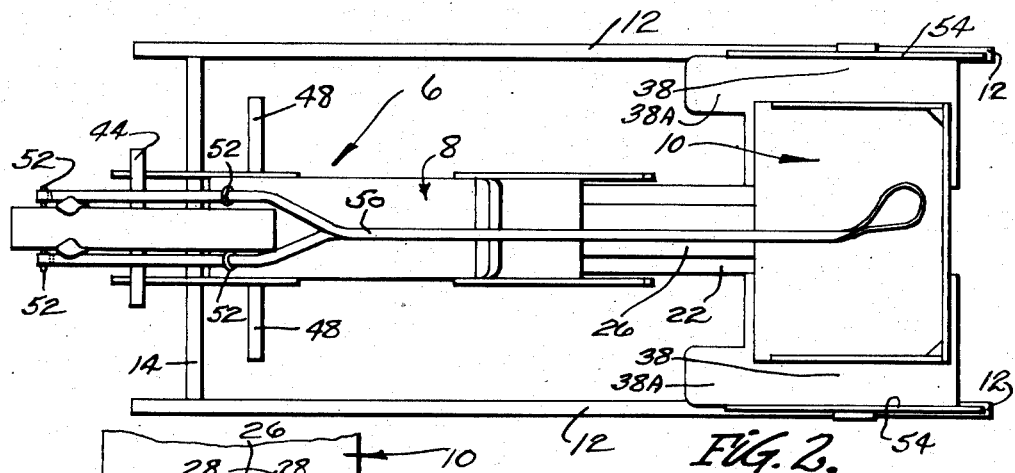
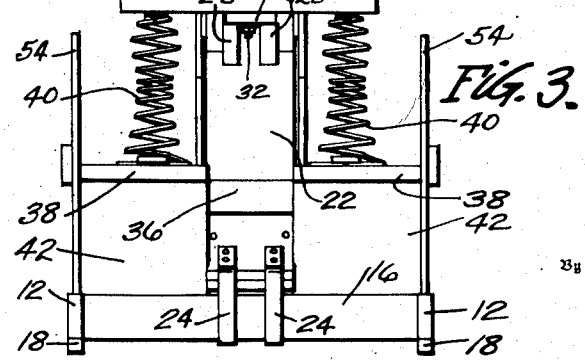
Inventor
FRANK I. LOUCKES
Attorneys Patented Oct. 13, 1953

2,655,375

UNITED STATES PATENT OFFICE 2,655,375

HOBBYHORSE

Frank I. Louckes, Memphis, Tenn.

Application December 21, 1951, Serial No. 262,727

4 Claims. (Cl. 272—52)

This invention relates to toys of resiliently supported hobby horse type.

The primary object of the invention is to provide a novel and attractive device for the amusement of children.

Other objects are to provide an amusement device which can be used by two children at the same time or if used by one only may at option or successively be used as a riding horse or a horse drawn vehicle, and To provide in a toy of horse and vehicle type subject to unbalanced loading, means adapted to compensate for such unbalancing.

To provide a device of the character described which may be built up largely from readily available materials, and The means by which these and other objects are accomplished and the manner of their accomplishment will readily be understood from the following specification on reference to the accompanying drawings, in which Fig. 1 is a side elevational view with portions shown in section, Fig. 2 is a corresponding plan view, Fig. 3 is an end elevational view.

Referring now to the drawings in which the various parts are indicated by numerals, 6 is a structure shaped to simulate a horse in motion, the horse having a saddle 8. Disposed rearwardly of the horse is a seat 10, simulating a vehicle seat. The horse and the seat 10 are supported from a base of rectangular shape, essentially comprising side rails 12 and cross rails 14 and 16 preferably with supporting blocks or feet 18 at the four corners.

The horse is supported from this base as by a leaf type spring 19 which is secured against the underside of the horse and therebelow to the base. Attachment of the spring to the base may be accomplished by spacing an auxiliary cross rail 20, which extends from side rail to side rail a short distance forwardly from the rear cross rail 16 anad attaching the rail 20 to the two side rails with its upper edge above the level of the rail 16.

With this construction the end of the leaf spring may rest on the rails 16 and 20 solidly anchored at its rear end to the rail 16 as by straps 24 and extends forwardly and upward to a junction with a longitudinally and horizontally disposed bar 26. The bar 26 extends rearwardly from the junction in overlying relation to the leaf spring diverging from and terminating vertically above the rear end of the spring. A triangular block 28 is interposed in the diverging junction and the spring, block and bar are firmly tied together as by bolts 30 and 32, establishing a solid corner for a resilient triangular spring structure.

The bar 26 of the spring structure is disposed in underlying relation to the body of the horse with the forward end of the bar and spring structure slightly forward of the center of the body of the horse and the bolts 30 and 32 are also used to secure the forward end of the spring structure to the body.

The rear portion of the bar 26 underlies and supports the seat 10 which is rigidly secured to the bar as by screws (not shown).

Overlying the auxiliary rail 20, is a strip 36 which is notched for the leaf spring 19 and forms the forward support for platforms 38, which preferably extend forwardly of the front of the seat to form foot rests 38A. Supports 42 secured to the rear rail 16 of the base extend upwardly to the level of the top of the auxiliary strip 36 and carry the rear ends of the platforms. Both platforms are securely anchored through the supports 42 and the strip 36, to the side and rear rails 12 and 16 of the horse.

Coil springs 40, preferably four in number, are disposed between the platforms 38 and seat 10 and are securely anchored to both the seat and the platforms. These springs supplement the leaf spring support of the seat by compressive resistance when the seat 10 is loaded and the saddle 8 unused, and supplement the action of the leaf spring on the horse by tensile resistance when the saddle is under load and the seat empty. When both seat and saddle are occupied the coil springs alternately act in tension and compression as the saddle and seat occupants bounce up and down and also act as shock absorbers.

Preferably a transverse rod 44, forming a handle bar extends through the head of the horse, and swing arms 46 depending from the body of the horse and carrying a similar transverse rod 48 provide foot rests for the horseman.

Reins 50 may be extended from eyes 52 at the sides of the mouth of the horse to the seat 10. Discs 54 each painted to simulate wheel spokes and a rim are preferably secured on opposite sides of the rear end of the structure below the seat level, but form no structural part of the device. The body of the horse is preferably painted in contrasting colors (not shown) to simulate a Palomino horse.

The toy may provide amusement for one child at a time or for two concurrently.

It will be understood that anchorage of various parts and other details may be varied without departing from the spirit of the invention and that matter herein set forth or shown in the accompanying drawings is to be interpreted as illustrative only.

I claim:

1. A toy device comprising support means, a resilient leaf spring member secured at one end to said support means and projecting diagonally upwardly away from said support means, a seat-like structure overlying and spaced above said support means, a plurality of spaced, vertically disposed compressible and expansible coil spring elements connecting said seat-like structure to said support means and resisting vertical movement of said seat-like structure relative to said support means, a horizontal bar, having one end interposed in the space between said coil spring elements and rigidly secured to said seat-like structure, the opposite end of said bar angularly intersecting and being rigidly secured to the other end of said diagonally disposed leaf spring member, said leaf spring, said bar, and said coil springs combining to establish a substantially triangular resilient suspension adapted for swinging movement responsive to swinging of said leaf spring and vertical movement, with said coil springs, and an animal-like body mounted on and secured to said bar adjacent the junction of said opposite bar end with said other leaf spring end, said coil spring elements resisting upward movement of said seat-like structure urged by downward movement of said animal-like body and urging return of said seat-like structure and said animal-like body to normal position, said coil spring elements cushioning downward movement of said seat-like structure, said bar coupling said seat-like structure and said animal-like body for conjoint movement.

2. A toy device comprising a diagonally disposed resilient leaf member, a plurality of vertical coil spring elements, a horizontal bar, means connecting one end of said bar to said coil springs, said bar angularly intersecting and being rigidly secured to said diagonally disposed leaf member, said leaf, said bar, and said coil springs combining to establish a substantially triangular resilient suspension adapted for swinging movement responsive to swinging of said leaf and vertical movement with said coil springs, said coil spring elements resisting upward movement of said bar end urged by downward movement of the intersection of said bar and said leaf, and urging return of said bar end to normal position, said coil spring elements cushioning downward movement of said bar end, said bar coupling said coil springs and said leaf for conjoint movement.

3. In a toy device which includes a seat-like structure and an animal-like body, a resilient leaf member secured at one end below said seat-like structure and projecting diagonally upwardly away from said secured end, a plurality of vertically disposed compressible and expansible coil spring elements connected to the under side of said seat-like structure and resisting vertical movement of said seat-like structure, a horizontal bar, having one end rigidly secured to said seat-like structure, the opposite end of said bar angularly intersecting and being rigidly secured to the other end of said diagonally disposed leaf member, said leaf, said bar, and said coil springs combining to establish a substantially triangular resilient suspension adapted for swinging movement responsive to swinging of said leaf spring and vertical movement with said coil springs, said animal-like body being mounted on and secured to said bar adjacent the junction of said opposite bar end with said other leaf end, said coil spring elements resisting upward movement of said seat-like structure urged by downward movement of said animal-like body and urging return of said seat-like structure and said animal-like body to normal position, said coil spring elements cushioning downward movement of said seat-like structure, said bar coupling said seat-like structure and said animal-like body for conjoint movement.

4. Suspension means adapted for use in a toy device comprising a seat and a body, a resilient leaf member anchored at one end and projecting diagonally upwardly away from said end, a plurality of substantially vertically disposed resilient elements, a horizontal bar, having one end connected to said resilient elements, the opposite end of said bar angularly intersecting and being rigidly secured to the other end of said diagonally disposed leaf member, said leaf, said bar, and said resilient elements combining to establish a substantially triangular resilient suspension adapted for swinging movement responsive to swinging of said leaf and vertical movement with said resilient elements and adapted to support a said seat and a said body adjacent the opposite ends of said bar.

FRANK I. LOUCKES.

References Cited in the file of this patent

UNITED STATES PATENTS

| Number | Name | Date |
| --- | --- | --- |
| 1,807,938 | Shoemaker | June 2, 1931 |
| 1,821,462 | Colella | Sept. 1, 1931 |